United States Patent [19]
Gardner

[11] 4,261,210
[45] Apr. 14, 1981

[54] STACKED WAFER HELICAL FLOWMETER

[76] Inventor: William L. Gardner, 9818 Etiwanda Ave., Northridge, Calif. 91325

[21] Appl. No.: 82,483

[22] Filed: Oct. 9, 1979

Related U.S. Application Data

[63] Continuation-in-part of Ser. No. 903,823, May 8, 1978, Pat. No. 4,170,133.

[51] Int. Cl.³ .............................................. G01F 1/58
[52] U.S. Cl. .................................. 73/861.12; 73/181
[58] Field of Search ................ 73/170 A, 181, 861.12, 73/861.15, 861.17

[56] References Cited

U.S. PATENT DOCUMENTS

| | | | |
|---|---|---|---|
| 2,557,393 | 6/1951 | Rifenbergh | 73/DIG. 2 |
| 3,503,258 | 3/1970 | Baker | 73/861.12 |
| 3,620,079 | 11/1971 | Nosley | 73/861.15 |
| 3,881,350 | 5/1975 | Nosley | 73/861.15 |
| 4,000,648 | 1/1977 | Olson | 73/861.15 X |

*Primary Examiner*—Charles A. Ruehl

*Attorney, Agent, or Firm*—Fulwider, Patton, Rieber, Lee & Utecht

[57] ABSTRACT

An electrical flowmeter having signal electrodes laterally spaced along a line perpendicular to fluid flow and sensitive to a voltage field set up in the fluid by a magnetic field is provided with a plurality of planar helically coiled conductive windings disposed in stacked arrangement parallel to the direction of fluid flow. The spiral windings are connected to a push-pull current drive source. The signal electrodes are spaced proximate to the outer coil winding of the coil closest to the fluid. The windings of the coils are alternately oriented in opposite, clockwise-counterclockwise disposition. Each spiral coil ends in an inner and an outer terminus, and the inner termini of all coils are connected together, while the outer termini of the clockwise disposed coils are connected in parallel with each other. The outer termini of the counterclockwise disposed coils are also connected in parallel with each other. The electrical field set up in the fluid impresses a voltage field across the signal electrodes proportional to relative fluid velocity and is immune from quadrature and hydrodynamic effects.

10 Claims, 9 Drawing Figures

STACKED WAFER HELICAL FLOWMETER

BACKGROUND OF THE INVENTION

This is a continuation-in-part of U.S. application Ser. No. 903,823, filed May 8, 1978, now U.S. Pat. No. 4,170,133.

FIELD OF THE INVENTION

The present invention relates to electromagnetic field flowmeters of the type which do not project into a stream of fluid flow. Such flowmeters are used as speed indicators for nautical vessels and as velocity measurement devices for fluid flow in conduits.

DESCRIPTION OF THE PRIOR ART

In the past, a number of different types of flowmeters have been employed which operate upon the principal of sensing a voltage between two electrodes in contact with a flowing fluid. A voltage field is induced in the fluid by a magnetic field set up by electromagnetic conductive windings. This field, in turn, impresses a voltage differential between the signal electrodes which is proportional to the velocity of fluid flow. In such devices the sensing signal electrodes are spaced laterally from each other along a line perpendicular to the direction of fluid flow. An elongated wound electrical coil is typically used to set up an electromagnetic field, which fields extends at least partially into the flowing fluid.

The induction coil configuration conventionally used to produce the electromagnetic field involves the use of a central core magnet about which a wire coil is cylindrically wound. The wound electromagnet is disposed generally perpendicular to fluid flow with an extremity extending substantially to the plane of a solid electrically insulating separating surface across which the fluid flows. The sensing signal electrodes are located diametrically opposite and radially outwardly from the electromagnet and contact the flowing fluid. The electromagnet produces a magnetic field which lies partially within with the flowing fluid. The flux lines or vectors of the magnetic field approach a perpendicular orientation relative to the boundary at the interface of the separating surface and the flowing fluid. As a result, an electrical potential is generated between the signal electrodes. The vector of this electrical potential is perpendicular to the flux lines of the magnetic field at the fluid interface with the boundary or separating surface. The electrical potential between the spaced electrodes is proportional to the fluid velocity component that is in the direction perpendicular to the orientation of the electrodes.

One conventional device which operates by sensing a voltage differential set up in a fluid between sensing electrodes is known as a "rod meter" and is described in a number of publications, including U.S. Pat. Nos. 2,969,673 and 3,677,082. In devices of this type, the electromagnetic field employed is generated by an electromagnet located in a rod extending perpendicular from a solid surface across which a fluid flows. Sensing electrodes are mounted on the sides of a rod and are in contact with the water flowing past it. While such a device functions adequately, the rod itself induces a certain amount of turbulence and/or drag relative to the flowing fluid. Both turbulence and drag are particularly disadvantageous when flowmeters of this type are used as speed indicators in nautical vessels, and especially small sailing vessels.

Other flow meters which sense electrical potential in a field which is altered depending upon the velocity of fluid flow past spaced electrodes include devices which protrude only slightly into the flowing fluid. Such instruments exhibit very little drag, when mounted on a nautical vessel, and induce only negligible turbulence in fluid flowing through a conduit. One such device is described in U.S. Pat. No. 4,079,626 in which the flowmeter is mounted substantially flush with a surface past which fluid flows. The magnetic field of the flowmeter described in U.S. Pat. No. 4,079,626 is a solenoidal coil wound on a ferromagnetic core. With a coil of this configuration, the magnetic field is almost totally confined to the small diameter of the core material. The total diameter of the structure is increased by the addition of windings which forces the electrodes to be spaced radially outwardly beyond the windings at a non-optimum position and spacing with respect to the magnetic field so produced. The electrodes and/or electrode leads could be made "L-shaped" to regain a near optimum position, but this is an added production inconvenience.

An additional disadvantage of conventional flowmeter systems is that the orientation of the induction coil and the sensing electrode leads must be exactly parallel to each other and perpendicular to the direction of fluid flow at the surface of fluid contact. Thus, even minor movement or contact with the exposed components produces serious inaccuracies in the measurement of fluid velocity.

SUMMARY OF THE INVENTION

It is an object of the present invention to provide an electromagnetic flowmeter which obviates the problems of non-optimum positioning and spacing of signal electrodes with respect to the magnetic field produced. This is achieved by stacking ferrite (ferromagnetic) wafers on or in each of which a planar spiral, metal helical winding is located. Such a stacked wafer configuration provides the distinct advantage of permitting near optimum placement of the signal electrodes with respect to the magnetic field produced. This is accomplished by spreading the magnetic field throughout the full diameter of the electromagnetic element instead of confining it to the central core of the more conventional cylindrical core and solenoidal winding.

A further object of the invention is to increase the strength of signals produced at the signal electrodes for a given amount of input power applied to the electromagnetic element. Sensor signal strength is the product of the flow velocity, magnetic field strength and effective spacing of the electrodes in the magnetic field. By means of the unique planar, helical winding configuration of the wafers of the invention, the sensor electrodes can be placed much closer to the electromagnetic element and thereby subjected to a greater magnetic field strength. For the same input power to the helical windings, the signal electrodes are influenced by a magnetic field of greater strength as contrasted with conventional electromagnetic flowmeter devices.

A further object of the invention is to provide a flowmeter construction in which the electromagnetic elements are quite simple to build. The wafers and windings of the invention may be produced by any of a variety of techniques. The wafers may be clad with a conducting material and etched. Alternatively, actual wire may be spirally wound in a planar, helical track in a recess in the wafers, or molten metal may be poured into such a recess. The wafers may be stacked to any desired height or length to conform to the power input available and to the sensitivity requirements of the signal electrodes.

A further object of the invention is to provide a flowmeter in which the induction and sensing elements are rigidly and immovably constrained. This is achieved by the unique inductor construction. Each spiral winding in each wafer preferably ends in an annular shaped terminus. Selected termini of the stacked wafers may be electrically connected by connecting rods which are received in through apertures in all of the wafers except the wafer in contact with the fluid. The connecting rods only contact the termini of this wafer and do not pass through it, since the coil must be electrically insulated from the fluid.

Conceivably, the innermost termini of each spiral winding may be connected together in parallel by a single wire conductor or rod running through the center of each wafer. The outer terminus of each spiral winding may likewise be connected in parallel by a similar conductor running down the outside of the wafer stack. However, such an arrangement would require a single ended current drive. Since the magnetic field is preferably reversed in polarity, the coil ends or termini in such an arrangement must be alternatively switched with respect to the current drive source.

A preferable, alternative configuration involves interleaving wafers with spiral coils oriented in clockwise fashion, as viewed from any particular perspective, alternatively with coils oriented in counterclockwise fashion. While clockwise and counterclockwise oriented coils might be manufactured as mirror images of each other, a simpler form of manufacture involves turning every other wafer "upside down". The same alternating arrangement of clockwise and counterclockwise coils is thereby achieved. In such a coil arrangement, a central conductor is received in through apertures in each of the wafers and establishes an electrical connection with every inner spiral terminus. The outer terminus of each clockwise oriented spiral coil is likewise connected together by means of an conductor that runs perpendicular to the wafer disposition. Similarly, each counterclockwise oriented spiral coil outer terminus is connected by another conductor running the full length of the stack. The solenoidal configuration so produced is a three terminal coil which may be driven similarly to a split winding or center tapped coil. This double ended electromagnetic configuration can then be powered by a push-pull current drive source to provide the desired magnetic field polarity reversals.

Preferably, each electromagnetic field producing element is a wafer, or disk within which, or upon which, a planar, spirally wound, electrically conductive winding is disposed. A single wafer or electromagnetic field producing element may be employed, as described in U.S. Pat. No. 4,170,133. However, by providing a stack of such planar elements, there is less criticality in the manner in which electrical leads are connected to the signal electrodes. Specifically, such connecting leads are perpendicular to the planar orientation of the planar, spirally wound wafers. However, with a stack of such wafers the electromagnetic field extends more nearly perpendicular to the wafer disposition and for a greater distance, corresponding to the height of the wafer stack. This subjects the leads connected to the signal electrodes to less undesired influence then does a magnetic field which is circular and toriodal about a single planar, helical spiral. Moreover, by using the wafers themselves as structural constraints, it is easier to position and maintain leads to the signal electrodes and also to the termini of the planar, spiral windings in a perpendicular orientation relative to wafer disposition. This is easily achieved by congruent notches and bores through the wafers and around the wafer edges.

It is quite important for the inductor coils of the invention to be wound in a spiral. A spiral which satisfies the structural requirements for the inductor of the invention includes a linear progressive winding, the area of which is progressively increasing. This includes not only a curved winding path, but also any polygonal pattern. Also, it is desirable for the electrical connecting leads from the electrodes to be parallel to each other and to lie in a plane perpendicular to the plane of the helical coil windings. As previously noted, the signal electrode leads can be constrained by the structure of the wafers themselves.

The flowmeter construction according to the present invention has several highly significant features. In the first instance, quadrature effects that plague conventional electromagnetic flowmeters are eliminated. Quadrature effects, sometimes called transformer coupling, are the effects which an electromagnetic field has on the electrode leads in conventional electromagnetic devices. Quadrature effects are exhibited as disruptive current vectors in the electrode leads as a result of orientation of the electrodes and their leads to a magnetic field. In the present invention, however, in the limit and at the interface of fluid contact with the boundary surface upon which the flowmeter inductor and sensor elements are mounted, the magnetic field formed by the inductor is perpendicular to the laminar structure of the inductor and electrodes. As a result, the field induced in the fluid medium which causes the adverse quadrature effects is perpendicular to the magnetic field from the inductor, and hence parallel to the laminar structure of the inductor and electrode leads. Being parallel to the inductor and sensor components, the field induced in the fluid medium exhibits practically no influence on the electrodes or on the electrode leads.

The various features and structure of the invention may be explained with greater particularity and clarity by reference to the accompanying drawings.

DESCRIPTION OF THE EMBODIMENT

Figure 1:
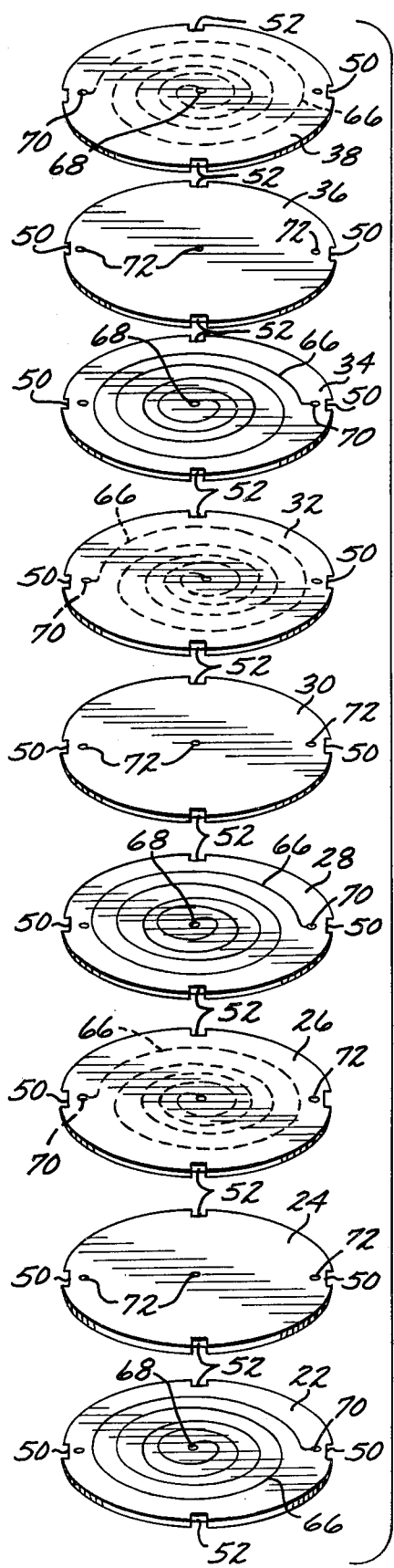
FIG. 1 is an exploded perspective view illustrating the modular construction of the electromagnetic field producing element of the flowmeter of the invention.
Figure 2:
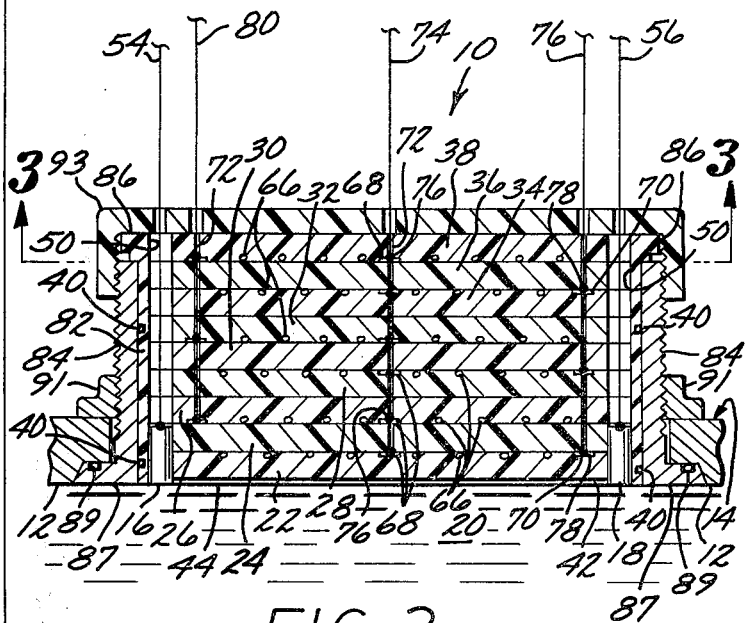
FIG. 2 is a sectional elevational view of a flowmeter constructed according to the invention.

FIG. 2 illustrates in sectional elevation the sensing and inductive elements, indicated generally at 10, of a flowmeter for measuring relative velocity of fluid flow past a surface. This surface is indicated as the exterior surface 12 of a boat hull 14, for example, and FIG. 2 may be considered to be a detail section at a through-opening in the hull 14. The flowmeter includes a plurality of signal electrodes 16 and 18 which are arranged to contact water 20 in which the hull 14 floats. The flowmeter includes a plurality of stacked wafers 22, 26, 28, 32, 34 and 38, depicted in FIGS. 1 and 2. Each of these wafers includes a spirally wound coil 66 which produces an electromagnetic field. The wafer 22 is in coplanar arrangement with the signal electrodes 16 and 18 and is electrically insulated from the fluid by a thin, dielectric disk 42 which has a separating surface 44 that contacts the water 20. All of the wafers 22, 26, 28, 32, 34 and 38 are arranged parallel to the direction of fluid flow and the coils 66 thereon produce a magnetic field normal to the planar orientation of the wafers at the separating surface 44. This magnetic field is illustrated diagrammatically in FIG. 7 by the magnetic lines of flux 46. The magnetic field set up by the coils 66 induces an alternating current voltage field in the water parallel to the orientation of the coils 66 at the separating surface 44. This voltage field is depicted as $E_V$ in FIG. 5 and is perpendicular to the direction of fluid flow and induces an alternating current in the signal electrodes 16 and 18 porportional to the velocity of fluid flow and in phase with the magnetic field produced by the stacked wafers.

Figure 3:
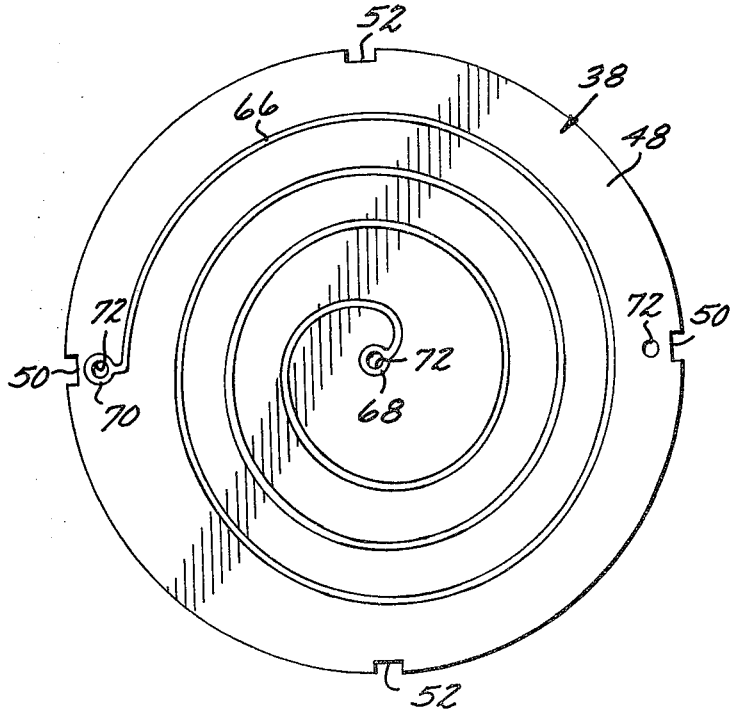
FIG. 3 is a plan view of a planar, spirally wound element as viewed in isolation along the lines 3—3 of FIG. 2.

The wafer construction is best illustrated in FIGS. 1–3. FIG. 3 illustrates the wafer 38 in detail. The wafer 38 has a disk-shaped ferrite support 48 into the surface of which a planar helical spiral channel is defined by etching, or by some other process. Radially inwardly directed notches 50 and 52 are defined at intervals spaced 90° apart about the periphery of the ferrite support 48. The notches 50 are defined 180° apart in opposite sides of the perimeter of the ferrite support 48 to receive the electrical leads 54 and 56 to the signal electrodes 16 and 18 respectively, as illustrated in FIG. 2. The notches 52 likewise are spaced on opposite sides of the perimeter of the ferrite support 48 and are adapted to receive electrical leads to optional, additional signal electrodes 58 and 60, illustrated in FIG. 4.

Figure 4:
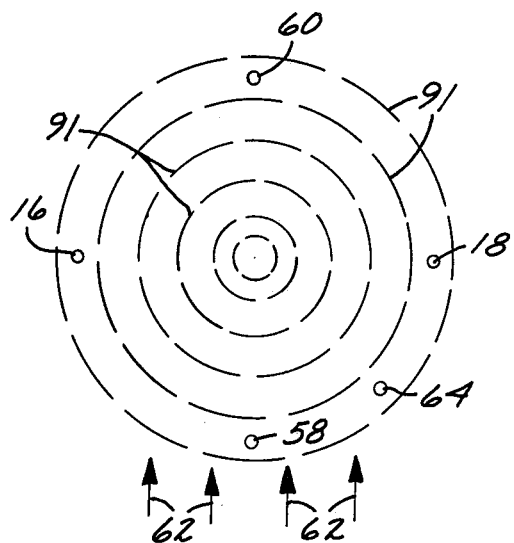
FIG. 4 diagrammatically depicts a secondary field induced in a fluid medium.

With reference to FIG. 4, a voltage field will exist between the electrodes 16 and 18 with relative fluid flow in the direction indicated by the flow directional arrows 62. With a flow direction as indicated in FIG. 4, a voltage field will exist only between the electrodes 16 and 18, and no voltage field will exist between the electrodes 58 and 60 since the orientation of these two electrodes is parallel to the direction of fluid flow. If, however, the direction of fluid flow is altered and is other than perpendicular to the alignment of the signal electrodes 16 and 18, a voltage field will be induced between the optional signal electrodes 58 and 60. By combining the output signals of the signal electrode pairs 16, 18 and 58, 60, a vector of actual fluid flow relative to the separating surface 44 can be derived by vector analysis of the vector components of flow in the directions of alignment of the signal electrode pairs 16, 18, and 58, 60. The outputs of the signal pairs may be referenced against a neutral, or ground reference signal electrode 64, illustrated in FIG. 4.

In the spiral channel in the ferrite support 48 depicted in FIG. 3 a metal wire is positioned, or metal is poured in a molten state to complete the formation of a spirally wound coil 66. The coil winding 66 in each wafer 38 lies recessed in the ferrite support 48. One end of each coil 66 terminates at the center of the ferrite support 48 in a terminus 68 of annular configuration. Likewise, the opposite end of each coil 66 has an annular outer terminus 70 located near the periphery of the ferrite support 48. The ferrite support 48 is constructed with through apertures 72, both at the center of the ferrite support 48 in alignment with the central opening in the annular terminus 68, and also near the periphery of the support 48. One through-aperture 72 is in alignment with the opening at the center of the annular outer terminus 70 of each wafer 48, while another through opening 72 is located diametrically opposite, near the opposite notch 50, as illustrated in FIG. 3.

The wafers are of identical construction, but alternate ones of the wafers are stacked facing the separating surface 44 of FIG. 2 and the other wafers are stacked facing away from the separating surface 44. As a result, when viewed from the separating surface 44, the planar, helical spiral coil windings 66 are disposed alternatively in clockwise and counterclockwise orientation. For example, the coil 66 of the wafer 38, from the vantage point of the separating surface 44, is disposed in a counterclockwise orientation. There is no structural distinction between the wafers 22, 26, 28, 32, 34 and 38. However, with alternate wafers flipped over so that half the coils 66 face the surface 44, the coils in the wafer stack are alternatively disposed in clockwise-counter and clockwise arrangement.

As illustrated in FIG. 2, the central inner termini 68 of all of the wafers 22, 26, 28, 32, 34 and 38 are linearly aligned and are electrically coupled together by a common wire or connecting rod 74. Electrical contact between the connecting rod 74 may be effectuated by forming the wire or rod 74 of a conductive metal coated with solder. A high current can then be passed through the wire 74 to melt the solder and create solder joints 76 at all of the inner termini 68 of all of the wafers.

In a similar fashion, a wire or electrical connecting rod 76 may be passed through all of the through apertures in the wafers 26, 28, 32, 34 and 38 and into electrical contact with the outer terminus 70 of the wafer 22. Solder joints 78 thereby join the outer termini 70 of the wafers 22, 28, and 34. These solder joints 78 are formed the same as the solder joints 76 on the wire 74.

In similar fashion, a diametrically opposite connecting rod or wire 80 joins the outer termini 70 of the wafers 26, 32 and 38. In this fashion, the inner and outer termini (68 and 70 respectively) of the field producing wafers of clockwise winding orientation (wafers 22, 28 and 34) are connected in parallel together. The inner and outer termini (68 and 70 respectively) of the field producing wafers 26, 32 and 38 of counterclockwise winding orientation are likewise connected together in parallel. As will be described hereinafter, all of the coils 66 are connected to an electrical push pull current drive source, illustrated in FIG. 9.

It is important for the coils 66 to be arranged separate from each other. Consequently, thin, disk-shaped spacers 24, 30 and 36, illustrated in FIGS. 1 and 2 are interposed between those coils 66 which face each other, and which would otherwise reside in mutual contact.

The wafers 24, 30 and 36 include through apertures 72 and notches 50 and 52, like the wafers 22, 26, 28, 32, 34 and 38, and in direct alignment with the corresponding through-apertures and notches in those wafers. The coils 66 thereby are maintained separated from each other and are able to set up the magnetic field depicted by the flux lines 46 in FIG. 7.

The wafers of the flow meter are coaxially aligned about the central through-apertures 72 therein. It should be noted, however, that the wafer 22 nearest the fluid interface at the separating surface 44 need not be perforated. While perforation may be desired as a manufacturing convenience, it is sufficient if the coil 66 faces upward and is accessible for electrical connection by the wires 74 and 76.

All of the wafers are coaxially aligned, and are glued in position within a surrounding annular plastic plug 82 which includes a radially outwardly extending annular shoulder 86 that resides in abutment against the upper end of a generally cylindrical mounting shell 84. The cylindrical mounting shell 84 is threaded externally except at its lower end where it has beveled flange 87 which fits into a corresponding recess in the exterior surface 12 of the boat hull 14. The beveled flange may be sealed to the hull by any convenient means, such as the O-ring 89. Similarly, O-ring seals 40 spaced apart in the exterior surface of the plug 82 may be used to ensure a water tight seal with the mounting shell 84. The mounting shell 84 is positioned in a through hole bore in the hull 14 and is held in place by means of a retaining nut 91, which is threadably engaged with the exterior threads of the mounting shell 84. The annular plug 82 is held in place within the mounting shell 84 by a removable retaining cap 93 that is also threadably engaged with the upper extremity of the mounting shell 84. The cap 93 has a central circular opening therein to allow passage of the electrical leads.

Since the entire wafer stack is secured to the annular plug 82, the plug 82 may be removed or replaced as desired, so that the flowmeter is adapted for removable insertion into an aperture in the fluid barrier formed at the outer surface 12 of the hull 14. As previously noted, the signal electrodes 16, 18, 58 and 60 are spaced closely to and radially outwardly from the spiral windings 66 of the wafer 22. The signal electrodes are not covered by the dielectric disk 42, but protrude therethrough and are sealed watertight at aligned apertures therein so that the signal electrodes contact the water.

Figure 8:
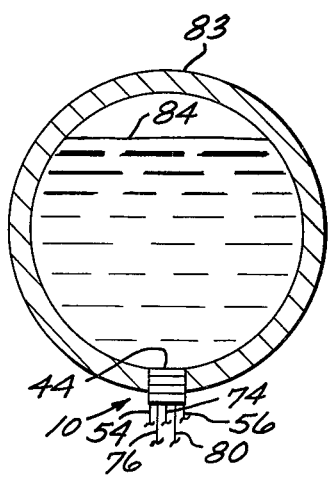
FIG. 8 illustrates the application of the invention to a fluid conduit.

While the application of the flowmeter depicted in FIG. 2 is as a knotmeter mounted in the hull 14 of a boat in a through-hull fitting, the invention may be used in alternative ways. For example, and as depicted in FIG. 8, the flowmeter may be utilized in association with a cylindrical pipe 83, through which a liquid 84, such as water, sewage, effluent, petroleum, or some other liquid substance flows. At the bottom of the inner surface of the pipe 83 the sensing and inductive element 10 is plug mounted in a through-wall aperture. The liquid 84 flows past the separating surface 44 and the sensor electrode leads 54 and 56 provide fluid velocity signals, while the connecting rods or wires 74, 76 and 80 are used to drive the coils 66 of the wafers in push-pull fashion. Because the separating surface 44 is flush with the inner surface of the pipe 83, the liquid 84 is able to flow past the inductive and sensing element 10 without turbulence.

Figure 6:
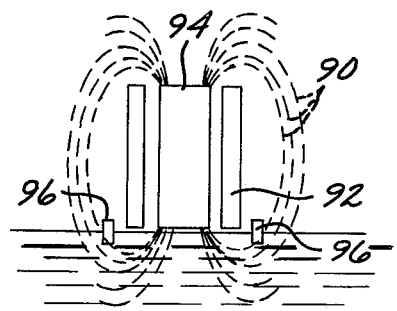
FIG. 6 illustrates a magnetic field set up by a prior art flowmeter.

As previously noted, a flowmeter including signal electrodes and planar helical winding coils of the configuration according to the present invention eliminates quadrature effects on signals developed at the signal electrodes 16 and 18, and at the optional signal electrodes 58 and 60. Conventional flowmeter arrangements produce a magnetic field as depicted in FIG. 6. In such conventional devices an inductor is formed by windings wound as a cylinder and positioned with the cylindrical axis perpendicular to the surface of fluid contact. A magnetic field having a generally torroidal pattern of oblong cross section magnetic flux lines is produced. In such conventional inductors, the magnetic lines of flux are perpendicular to the surface of fluid contact only at the cylinder axis, and are oriented at increasing angles relative to the perpendicular with distance from the cylinder axis. With reference to FIG. 6, magnetic lines of flux 90 are set up relative to an induction coil 92 wound about a central cylindrical core 94. It can be seen that the magnetic flux lines at the electrodes 96 do not extend perpendicular thereto. In contrast, the helically wound coils 66 in the wafer stack 10 in the flowmeter of the present invention produce a magnetic field having flux lines indicated at 46 in FIG. 7. The flux lines 46 are much more nearly perpendicular to the surface of fluid contact throughout the span between the electrodes 16 and 18 then are the magnetic flux lines 90 between the electrodes 96 of the conventional system in FIG. 6.

Figure 7:
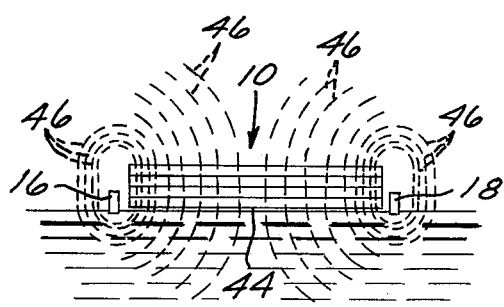
FIG. 7 illustrates a corresponding field set up by the flowmeter of the invention.
Figure 5:
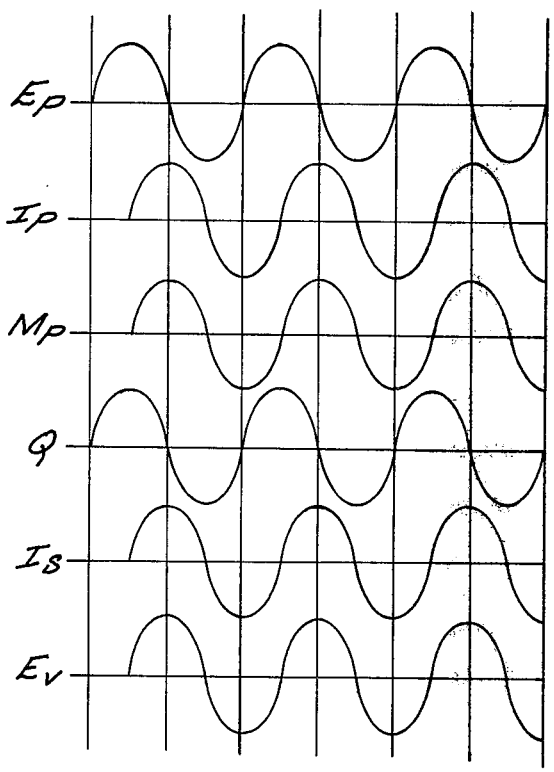
FIG. 5 depicts illustrative waveforms of significant signals associated with the flowmeter of the invention.

The voltage applied to the windings 66, in the present invention, and to the windings indicated at 92 in conventional devices is an alternating voltage having a phase as indicated at $E_P$ in FIG. 5. The current in the same windings is 90° displaced from the voltage phase both in the prior systems, and in the present invention, and is indicated at $I_P$ in FIG. 5. The magnetic field, indicated both by the flux lines 90 in FIG. 6 and by the flux lines 46 in FIG. 7, is in phase with the induction current $I_P$ and is indicated by the designation $M_P$ in FIG. 5. Both in prior art devices and in the present invention a secondary or quadrature voltage Q is induced in the water. The quadrature voltage Q is 90° out of phase with the inductor magnetic field, as indicated in FIG. 5. That is, the voltage Q is always 90° out of phase with the magnetic field signal $M_P$. The signal $E_V$, generated or induced as a result of fluid flow and which is the desired signal in FIG. 5 indicates the signal voltage induced between the electrodes 16 and 18 in FIG. 7. This voltage likewise is 90° out of phase with the quadrature voltage Q, and is in phase with the current signal $I_S$.

The quadrature signal is always an undesirable influence, as it serves to disrupt the signals induced in the signal electrodes. The quadrature field itself is a counterbalanced circular field having field lines 91, as depicted in FIG. 4. Quadrature effects are obviated in the present invention because the quadrature signals always act perpendicular to the magnetic flux lines 46, so that they are 90° phase displaced from the cyclical rise and collapse of the magnetic field, indicated by the signal $M_P$ in FIG. 5. Because of the 90° phase displacement, it is relatively easy to discriminate against the quadrature signal Q using the flowmeter of the present invention. The quadrature signal acts parallel to the surface of contact 44 indicated in FIG. 7, but at a 90° displacement from the magnetic field $M_P$. The quadrature signal Q also acts 90° out of phase with the signal $I_S$ which is the current signal set up between the electrodes 16 and 18. A synchronous gating signal, therefore, can be used to discriminate against the quadrature signal Q while still detecting the peak current $I_S$.

In prior art systems because of the imprecision in geometry of the inconductor and electrode leads, the quadrature voltage Q is not nearly as suppressed relative to the current signal $I_S$ as is the case in the present invention. It is therefore much more difficult to discriminate against quadrature in prior art systems as contrasted with the flowmeter of the present invention. The flowmeter of the present invention, therefore, is essentially immune from quadrature effects.

Figure 9:
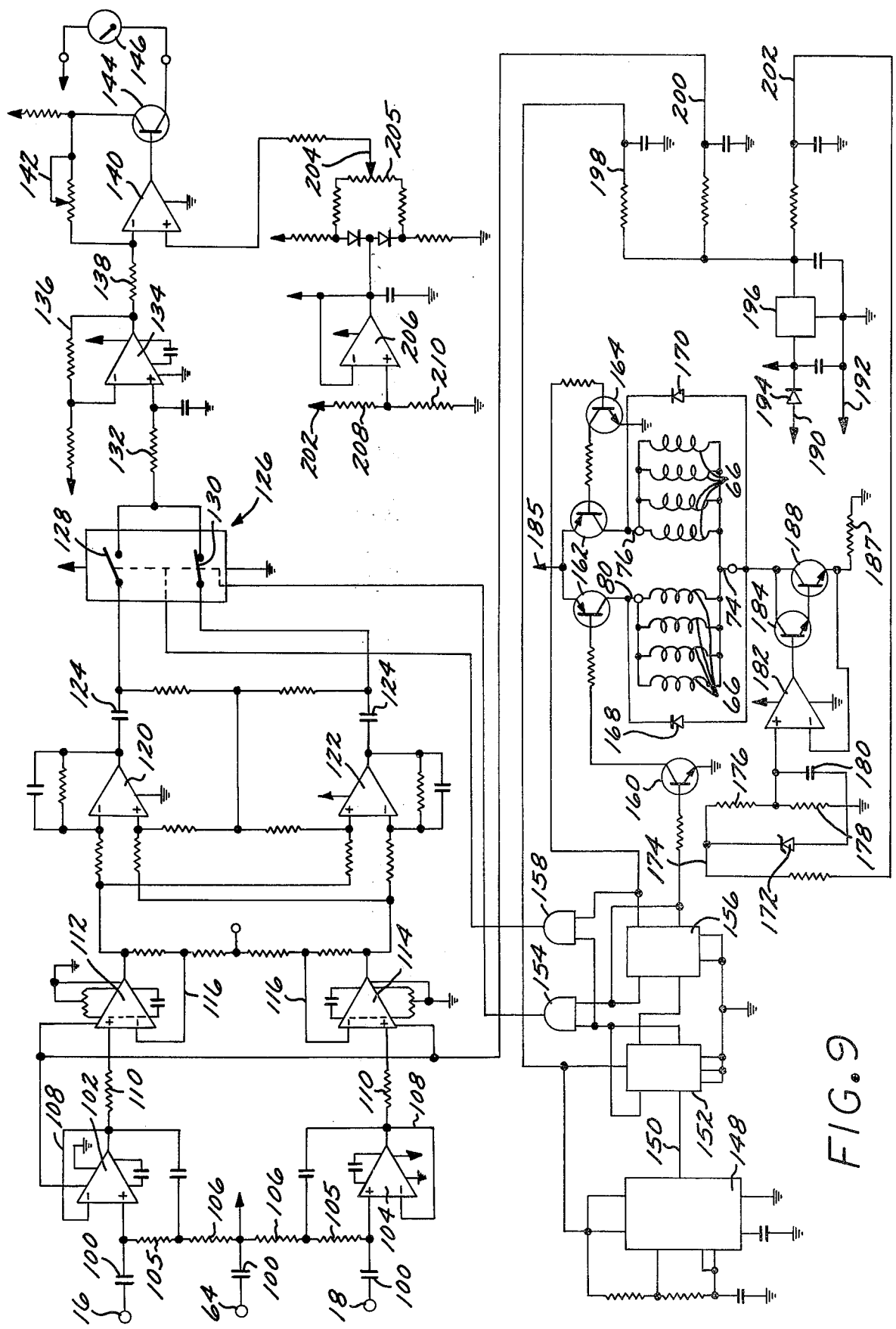
FIG. 9 is a schematic diagram of the electrical circuitry of the flowmeter of the invention.

The electronic components of the flowmeter according to the present invention are depicted in FIG. 9. From the sensor electrodes 16 and 18, signals are derived which are shaped as pulses and are transferred to preamplifiers 102 and 104 by capacitors 100. The preamplifiers 102 and 104 are used to preamplify the sensor output signals with a high input impedance. Resistors 105 and 106 are connected across the inputs to the preamplifiers 102 and 104 at one terminal of each. The interconnection of the resistors 106 is connected to another capacitor 100, which, in preferred practice, is virtually grounded by the neutral electrode 64, depicted in FIG. 4.

With the feedback loop 108 to each of the preamplifiers 102 and 104, the preamplified output signals of the signal electrodes 16 and 18 are directed through resistors 110 to inputs to amplifiers 112 and 114. Feedback loops 116 are provided to the opposite amplifier inputs. The outputs of the amplifiers 112 and 114 are directed to the inverting input terminals of amplifying stages 120 and 122. The amplifiers 120 and 122 are amplifiers which produce outputs coupled through capacitors 124 to a synchronous detector switch unit 126. The synchronous detector unit 126 allows switches 128 and 130 to alternatively gate through the signals from the sensor electrodes 16 and 18, or to prevent the transmission of any signal between appropriate signal times.

The output of the synchronous detector 126 on line 132 is a direct current voltage which is directly proportional to the electrode potential generated between the electrodes 16 and 18 due to the interaction of the electromagnetic field, indicated by the flux lines 46 in FIG. 7, and the moving water. Therefore, the direct current signal on line 132 is directly proportional to the velocity of the water relative to a vessel, to a fixed location, or to a pipe line. Using available circuit components, the direct current signal on line 132 is usually of low amplitude and is applied to one of two opposing inputs to an operational amplifier 134 which also has a feedback loop 136 to the opposing input. The amplifier 134 is coupled to a resistor 138, and then to one input of a differential amplifier 140.

A transistor 144 is located at the output of the differential amplifier 140, and provides a signal to the meter 146 to deflect the meter needle to indicate the appropriate speed of fluid past the signal electrodes. The meter 146 thereby serves as a fluid velocity indicator. The deflection to the meter needle is proportional to the velocity component perpendicular to the linear orientation of the electrodes 16 and 18.

If optional electrodes 58 and 60 are utilized, they likewise would include amplification circuitry for providing a signal to the meter 146 similar to the circuitry associated with the signal electrodes 16 and 18 in the upper portion of FIG. 9. In addition, a square root summing network would be required to provide a velocity vector where fluid flow is at some angle relative to the flow lines 62 indicated in FIG. 4.

A wiper on the feedback loop 142 serves as a calibration device for the meter 146 to calibrate the gain of the amplifier 140. The reference or zero level of the meter 146 is calibrated by another wiper 204 along a resistor 205. The wiper 204 is a voltage tap connected to the output of amplifier 206. Amplifier 206 divides the voltage from line 202 directly in half, using resistors 208 and 210. The output of amplifier 206 represents a phantom ground for all stages against which the meter 146 is calibrated. The synchronous gate 126 is operated under the ultimate control of an oscillator 148, which is connected to provide an output pulse at a predetermined clock interval on line 150. The oscillator 148 is a low frequency device which may be used to generate any desired wave shape, depending upon the application. Preferably, the oscillator 148 develops square waves in order to more easily discriminate against quadrature components. Almost any alternating wave shape may be used to drive the spiral coils 60, but a square wave is preferred to reduce or eliminate quadrature effects. The oscillator 148 generates short duration pulse signals with a relatively long time between signals to decrease the duty cycle of the overall system in order to conserve power. The oscillator drive ultimately provides signals to the bases of transistors 160 and 164 to cause the transistors 160 and 164 to serve as drivers for amplifiers 162 designed to drive the coil windings 66 in push-pull fashion by the connecting leads 80 and 76, previously described.

The oscillator output pulses on line 150 are directed to the clock input of the D flip flop 152. The $\bar{Q}$ output of the flip flop 152 is connected as one input to a NAND gate 154 and is returned to the D input of flip flop 152. The Q output of flip flop 152 is connected as the clocking input to another flip flop 156. The $\bar{Q}$ output of flip flop 156 is connected as the other input to NAND gate 154. The $\bar{Q}$ output of flip flop 152 is connected as an input to NAND gate 158, and the Q output of flip flop 156 is the other input hereto. The NAND gates 154 and 158 thereby sequentially and alternatively conduct to respectively operate the quadrature gates 130 and 128 in the synchronous detector 126.

The $\bar{Q}$ output of flip flop 156 is also connected to the base of the transistor 160, the collector of which is connected to the base of another transistor 162. The Q output of flip flop 156 is connected to the base of yet another transistor 164, the collector of which biases the base of another transistor 162. Together, transistors 160 and 164 serve as drivers for transistors 162 to drive an alternating current, cyclically and oppositely pulsing the lines 76 and 80 to drive the clockwise coils 66 of alternate wafers 22, 28 and 34 in parallel, and to likewise drive the counterclockwise coils 66 of the other alternate wafers 26, 32 and 38 in parallel. The physical configurations of the coils 66, and the stacked wafers with which they are associated was previously described in conjunction with FIGS. 1-3. Rectifying diodes 168 and 170 are connected in parallel with the push-pull connected coil windings 66 to clip inductive kick at turn off.

A zenor diode 172 is provided and is connected to a direct current voltage source from line 174 and across a pair of resistors 176 and 178. A capacitor 180 is connected across the terminals of resistor 178. A center tap between the resistors 176 and 178 is connected to one input of a differential amplifier 182, the output of which is connected to the base of transistor 184. The collector of the transistor 184 is coupled to the common connecting rod or wire 74, which in turn is connected to the inner termini 68 of all of the windings 66 of the wafers. The collector of the transistor 184 is also connected to the collector of a transistor 188. The emitter of transistor 184 is connected to the base of transistor 188. The emitter of transistor 188, in turn, is connected in a loop to an opposing input of amplifier 182.

The purpose of the circuit employing the amplifier 182 and including a collector connection to the common connecting wire 74 is to provide a varying impedance level to the inner termini 68 so that a current of constant amplitude is driven through the coil windings 66.

The supply voltage for the inductor coils 66 appears at 185. As the voltage source discharges or changes, the voltage input is varied. This change is reflected by the voltage appearing across the resistor 187. This same voltage, in turn, is fed to the inverting terminal of the amplifier 182. The output of the amplifier 182 reflects this change, so that if a decrease is sensed by resistor 187, the total output of amplifier 182 will be increased. The converse is also true. The strength of the output of amplifier 182 governs the voltage output at the collector of transistor 188. In this way, a constant current is maintained through the inductors 66 as they are pulsed.

Voltage for the system is provided from a 12 volt d.c. source, such as lead storage battery, on leads 190 and 192. Lead 190 is connected through a rectifying diode 194 to a voltage regulating circuit 196. Resistor taps at 198, 200 and 202 provide output d.c. voltage supply levels for use within the circuit depicted in FIG. 9 as indicated.

It should be noted that the synchronous detector 126 and the coil drive transistors 160, 162 and 164 are all operated from a common alternating cycle current source, specifically the oscillator 148. This ensures that the signal processing circuitry of FIG. 9 will gate through signals from the electrodes 16 and 18 to the amplifier 134 only when the electromagnetic lines of force M$_P$ set up by the actual driving field are present in the coil windings 66. This occurs when the quadrature field Q is at a minimum in the present invention.

The high input impedance of the preamplifiers 102 and 104 and the subsequent minimal loading allow the system to be utilized in fresh as well as salt water, and in other fluids which have different conductivities. Therefore, it is only the voltage differential between the electrodes 16 and 18, as referenced against the neutral electrode 64, which is created due to motion of the water or other fluid through the electromagnetic field and which influences the operation of amplifiers 102 and 104.

While various modifications and alterations of the invention will undoubtedly become readily apparent to those familiar with flowmeters, it must be appreciated that the invention resides not so much in the details of the specific implementations depicted in the drawings, but rather in the overall concept of the subject matter of the invention as set forth in the appended claims.

I claim:

1. In a flowmeter for measuring relative velocity of fluid flow therepast, the improvement comprising:
 a plurality of signal electrode means arranged to contact said fluid, and a plurality of stacked planar, spirally wound electromagnetic field producing means, an end one of which is in coplanar arrangement with said signal electrode means and is electrically insulated from said fluid by a separating surface and arranged parallel to a direction of fluid flow to produce a magnetic field normal to the planar orientation of said field producing means at said separating surface to induce an alternating current voltage field in said fluid parallel to said field producing means at said separating surface and perpendicular to the direction of fluid flow, thereby inducing an alternating current in said signal electrode means proportional to the velocity of fluid flow and in phase with said magnetic field.

2. A flowmeter according to claim 1 wherein each of said spirally wound field producing means includes an inner terminus and an outer terminus, and said field producing means are stacked alternatively with said spiral windings in a clockwise orientation and with said spiral windings in a counterclockwise orientation, and the inner and outer termini of the field producing means of clockwise winding orientation are connected in parallel together and the inner and outer termini of the field producing means of counterclockwise winding orientation are connected in parallel together, and all of said field producing means are connected to an electrical push-pull current drive source.

3. A flowmeter according to claim 2 further characterized in that all of the inner termini of said field producing means are linearly aligned and are electrically coupled together.

4. A flowmeter according to claim 2 further characterized in that said field producing means are of identical construction and are positioned to alternatively face in opposite directions.

5. A flowmeter according to claim 2 further characterized in that said inner and outer termini are of annular configuration and said field producing means which are stacked on said end field producing means are constructed with throughapertures coaxial with the centers of said termini, whereby electrically conductive connectors electrically join said termini together as aforesaid.

6. A flowmeter according to claim 2 further comprising signal amplification means connected to said signal electrode means, fluid velocity indicating means connected to said amplification means, and synchronous gating means interposed between said signal electrodes and said fluid velocity indicating means and operated by said push-pull current drive source to gate signals from said signal electrodes to said fluid velocity indicating means in synchronism with the output of said push-pull current drive source.

7. A flowmeter according to claim 1 further characterized in that each of said field producing means is formed of a ferromagnetic wafer, in one surface of which a spiral electrically conductive winding is recessed, and said windings are separated from direct contact with each other.

8. A flowmeter according to claim 7 further characterized in that said wafers are of identical geometric construction and include notches defined in opposite sides of their perimeters to receive electrical leads to said signal electrode means.

9. A flowmeter according to claim 1 further characterized in that said signal electrodes are spaced closely to and radially outwardly from spiral windings of said end electromagnetic field producing means.

10. A flowmeter according to claim 1 further characterized in that said signal electrodes and said electromagnetic field producing means are arranged in a plug which may be inserted into an aperture in a fluid barrier in removable fashion.

* * * * *